(12) United States Patent
Loucks et al.

(10) Patent No.: US 7,566,990 B2
(45) Date of Patent: Jul. 28, 2009

(54) POWER SYSTEMS AND METHODS USING AN INDUCTION GENERATOR IN COOPERATION WITH AN UNINTERRUPTIBLE POWER SUPPLY

(75) Inventors: David Glenn Loucks, Coraopolis, PA (US); John Charles Merrison, Milwaukee, WI (US); Rune Lennart Jonsson, Raleigh, NC (US); Robert William Johnson, Raleigh, NC (US); Ian Thomas Wallace, Whitefish Bay, WI (US); Timothy Hedquist, Sugar Hill, GA (US)

(73) Assignee: Eaton Corporation, Cleveland, OH (US)

( * ) Notice: Subject to any disclaimer, the term of this patent is extended or adjusted under 35 U.S.C. 154(b) by 136 days.

(21) Appl. No.: 11/780,520

(22) Filed: Jul. 20, 2007

(65) Prior Publication Data
US 2009/0021080 A1 Jan. 22, 2009

(51) Int. Cl.
*H02J 9/00* (2006.01)
(52) U.S. Cl. ........................................ 307/64
(58) Field of Classification Search .................. 307/64
See application file for complete search history.

(56) References Cited

U.S. PATENT DOCUMENTS

| | | | | |
|---|---|---|---|---|
| 6,134,124 A * | 10/2000 | Jungreis et al. | ............... | 363/34 |
| 6,169,390 B1 * | 1/2001 | Jungreis | ........................ | 322/4 |
| 7,230,344 B2 * | 6/2007 | Pollack et al. | ............ | 290/40 C |

* cited by examiner

*Primary Examiner*—Albert W Paladini
*Assistant Examiner*—Michael Rutland Wallis
(74) *Attorney, Agent, or Firm*—Myers Bigel Sibley & Sajovec, P.A.

(57) ABSTRACT

A power system includes a load bus configured to be connected to a power source, a generator and an uninterruptible power supply (UPS). The generator is operated as an induction generator to provide power to the load bus while providing reactive power to the load bus from the UPS. In some embodiments, prior to operating the generator as an induction generator, the generator is operated as an induction motor while the load bus is receiving power from the power source. Responsive to loss of the power source, the UPS may be used to maintain operation of the generator as an induction motor while the prime mover accelerates up to a speed sufficient to drive the generator as an induction generator.

18 Claims, 6 Drawing Sheets

POWER SYSTEMS AND METHODS USING AN INDUCTION GENERATOR IN COOPERATION WITH AN UNINTERRUPTIBLE POWER SUPPLY

BACKGROUND OF THE INVENTION

The invention relates to power systems and methods and, more particularly, to power systems and methods employing generators.

Power systems for facilities may serve critical, life safety and other types of loads that require high availability. A typical power system for such a facility, therefore, may include an auxiliary generator, such as a diesel-powered motor-generator set, which may supply power to these loads when a primary power source, such as a utility source, fails.

A typical emergency backup power system may include a wound-field synchronous generator. Typically, in response to a loss of utility power, the load bus of the system is disconnected from the utility source and facility loads are disconnected from the load bus. The generator motor is started and accelerated and a field voltage applied to the rotor field windings to regulate the output voltage. The generator typically remains disconnected from the load bus until the synchronous generator achieves an output voltage and frequency control within acceptable limits. Loads may be selectively connected to the load bus after the generator energizes the load bus. Connection of a load may cause voltage and frequency fluctuations that can further delay connection of additional loads.

Thus, the time required to bring such a generator fully on line may include time required to detect the outage, time required to decouple the load bus from the utility source, time to disconnect the loads from the load bus, time to bring the generator tip to an acceptable voltage and frequency, time to connect the generator to the load bus and time to connect loads to the load bus. These operations may take on the order of several seconds, which may negatively affect the availability of certain loads.

SUMMARY OF THE INVENTION

Some embodiments of the present invention provide methods of operating a power system including a load bus configured to be connected to a power source, a generator and a uninterruptible power supply (UPS), wherein the generator is operated as an induction generator to provide power to the load bus while providing reactive power to the load bus from the UPS. In some embodiments, prior to operating the generator as an induction generator to provide power to the load bus while providing reactive power to the load bus from the UPS, the generator is operated as an induction motor while the load bus is receiving power from the power source. Operating the generator as an induction generator to provide power to the load bus while providing reactive power to the load bus from the UPS may include driving the generator with a prime mover responsive to a loss of the power source.

According to further embodiments, driving the generator with a prime mover responsive to a loss of the power source is preceded by driving the generator with the UPS responsive to the loss of the power source to maintain operation of the generator as an induction motor. Driving the generator with a prime mover responsive to a loss of the power source may include accelerating the prime mover while driving the generator with the UPS and engaging the generator with the prime mover responsive to a status of the prime mover meeting a predetermined criterion.

In further embodiments, operating the generator as an induction generator to provide power to the load bus while providing reactive power to the load bus from the UPS is followed by operating the generator as a synchronous generator to provide power to the load bus. For example, operating the generator as an induction generator to provide power to the load bus while providing reactive power to the load bus from the UPS may include shorting a rotor field winding of the generator and operating the generator as a synchronous generator to provide power to the load bus may include applying an excitation current to the rotor field winding.

Further embodiments of the present invention provide power systems. A power system according to some embodiments of the present invention may include a generator configured to be coupled to a load bus and a UPS configured to be coupled to the load bus. The system further includes a control circuit operatively associated with the generator and the UPS and configured to detect a loss of a power source coupled to the load bus and to responsively operate the generator as an induction generator to provide power to the load bus while providing reactive power to the load bus from the UPS. The system may further include a prime mover operatively associated with the control circuit and the control circuit may be further configured to operate the generator as an induction motor while the load bus is receiving power from the power source and to cause the prime mover to drive the generator as an induction generator responsive to a loss of the power source. The control circuit may be configured to cause the UPS to drive the generator responsive to the loss of the power source to maintain operation of the generator as an induction motor. The control circuit may be further configured to cause the UPS to also serve a load via the load bus while driving the generator. The control circuit may be further configured to transition the generator from operation as an induction generator to operation as a synchronous generator.

Still further embodiments of the present invention provide an apparatus for controlling a power system including a load bus configured to receive power from a power source, a generator configured to be coupled to the load bus and a UPS configured to be coupled to the load bus. The apparatus includes a generator control circuit operative to selectively operate the generator as an induction motor and an induction generator based on a status of the power source. The apparatus further includes a UPS control circuit configured to selectively provide real and reactive power to the load bus from the UPS in cooperation with the generator control circuit. For example, the UPS control circuit may be configured to cause the UPS to deliver reactive power to the load bus when the generator is operating as an induction motor. The generator control circuit may be configured to operate the generator as an induction motor while the load bus is receiving power from the power source and to cause a prime mover to drive the generator as an induction generator responsive to a loss of the power source. The UPS control circuit may be configured to cause the UPS to provide power to the generator response to the loss of the power source to maintain operation of the generator as an induction motor. The generator control circuit may be configured to selectively operate the generator as an induction motor, an induction generator and a synchronous generator and to transition the generator from operation as an induction generator to operation as a synchronous generator after the loss of power.

DETAILED DESCRIPTION OF EXEMPLARY EMBODIMENTS

Figure 1:
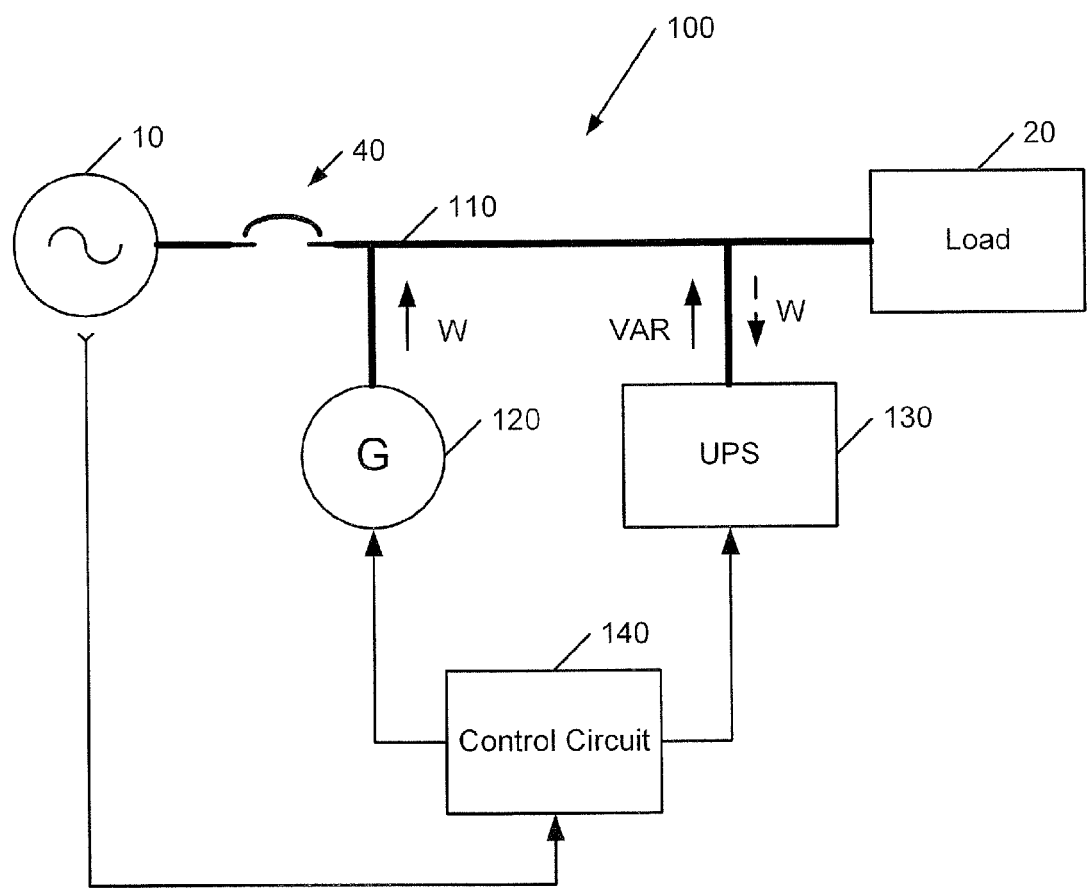
FIG. 1 is a schematic diagram illustrating a power system and operations thereof according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The technology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as system and methods. Embodiments of the invention may include hardware and/or software. Embodiments of the invention include circuitry configured to provide functions described herein. It will be appreciated that such circuitry may include analog circuits, digital circuits, and combinations of analog and digital circuits.

The invention is described below with reference to block diagrams and/or operational illustrations of systems and methods according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the invention arise from a realization that a UPS may be advantageously used to supply reactive power to support the operation of an induction generator. In further embodiments, a UPS may be used to reduce the time needed to transition a power system from operation off a power source, such as a utility source, to generator-powered operation by operating the generator as an induction motor while the power source is present and, responsive to a loss of the power source, using the UPS to aid transition of the generator to operation as an induction generator. In some embodiments, the generator may subsequently transition to operation as a synchronous generator.

FIG. 1 illustrates a power system 100 and operations thereof according to some embodiments of the present invention. The distribution system 100 includes a load bus 110 that is configured to be connected to a load 20 and to receive power from a power source 10, such as a utility source, connected to the load bus 110 through a utility breaker 40. The system 100 also includes a generator 120 and a UPS 130, each configured to be coupled to the load bus 110. The generator 120 may be for example, a natural gas or diesel-fueled motor-generator set, while the UPS 130 may be, for example, an on-line, standby or line-interactive UPS.

The system 100 further includes a control circuit 140 that is configured to control the generator 120 and the UPS 130. In particular, in some embodiments of the present invention, the control circuit 140 may be configured, responsive to a loss of the power source 10, to support operation of the generator 120 as an induction generator that supplies real power to the load bus 110. The control circuit 140 is further configured to control the UPS 130 such that the UPS 130 provides reactive power to the load bus 110 in support of the operation of the generator 120 as an induction generator. For example, as described in greater detail below, the UPS 130 may include a front-end converter (e.g., a four-quadrant active rectifier) that may be controlled by the control circuit 140 such that the UPS 130 delivers reactive power (volt-amperes reactive VARs) while concurrently receiving real power (watts W) from the load bus 110 to provide power to loads connected thereto and/or to charge an auxiliary power source, such as a battery or flywheel energy storage device.

It will be appreciated that the components illustrated in FIG. 1 may be configured in a number of different ways. For example, the control circuit 140 may include a separate circuit module or other electronic assembly configured to interface with the generator 120 and the UPS 130, e.g., through a communications bus or other signaling infrastructure. In further embodiments, the control circuit 140 may be integrated with control circuitry of the generator 120 and/or the UPS 130. For example, in some embodiments, the generator 120 and UPS 130 may form an integrated unit that includes circuitry that performs the functions of the control circuit 140. It will be further understood that, generally, the control circuit 140 may be implemented using analog circuitry, digital circuitry (e.g., a microprocessor or microcontroller) or combinations thereof.

Figure 2:
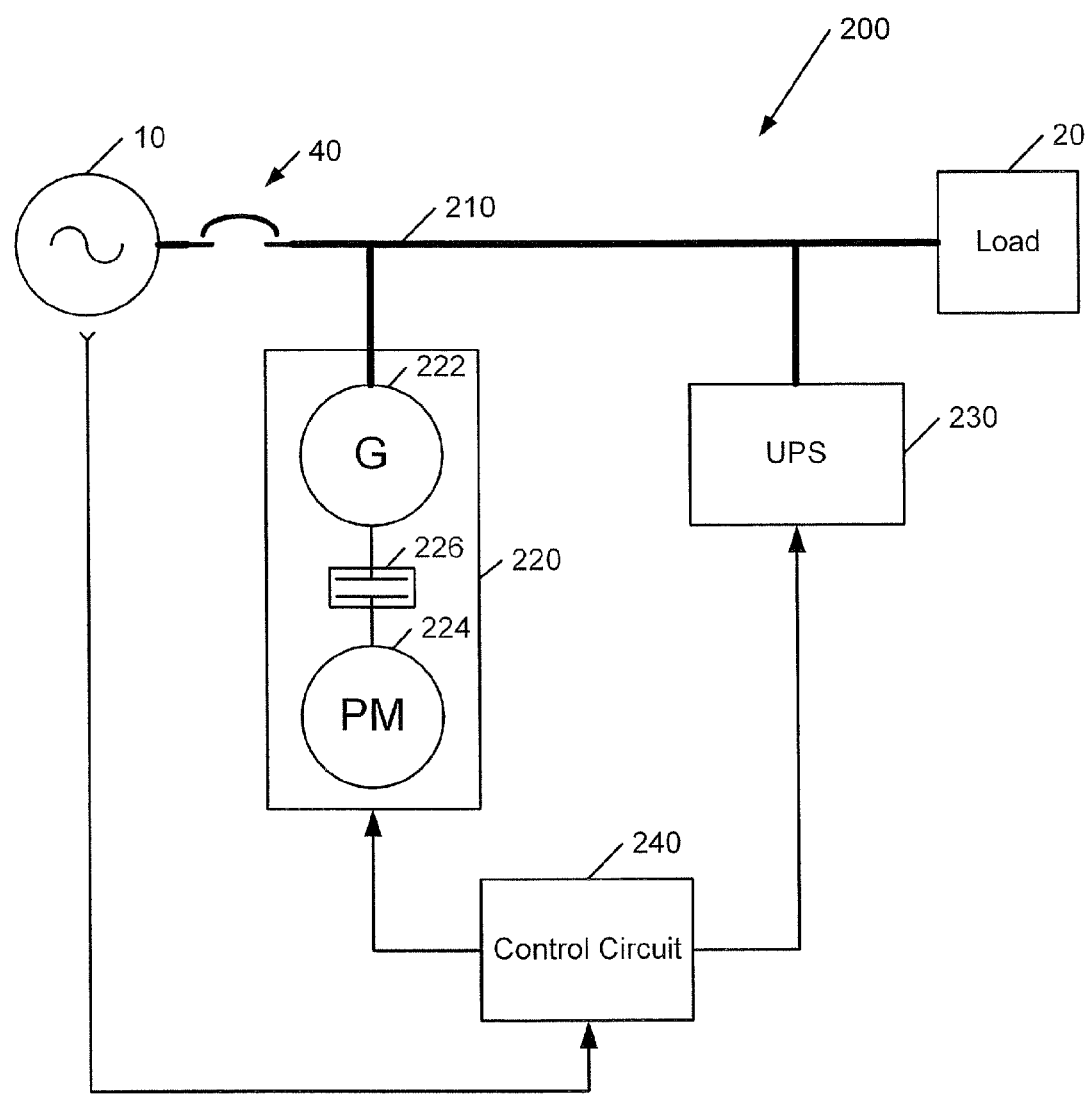
FIG. 2 is a schematic diagram illustrating a power system and operations thereof using dual-mode operation of an induction machine according to further embodiments of the present invention.

According to additional embodiments of the present invention, a configuration along the lines shown in FIG. 1 may also be used to speed transition to generator-powered operation. Referring to FIG. 2, a power system 200 according to some embodiments of the present invention includes a generator system 220 and a UPS 230 coupled to a load bus 210. The generator system 220 includes a generator 222 that may be selectively mechanically coupled to a prime mover 224, such as a diesel engine, via a clutch 226.

While a power source 10 is available, a control circuit 240 may control the generator system 220 such that the generator 222 operates as an induction motor driven by the power source 10. In particular, the clutch 226 may be disengaged such that the generator 222 may freely rotate at near rated speed, drawing power mainly to overcome windage and mechanical losses. While the power source 10 is available, the UPS 230 may be controlled to supply volt-amperes reactive (VARs), i.e., reactive power, to support operation of the generator 222 as an induction motor.

The control circuit 240 may detect a loss of the power source 10 using a variety of techniques. For example, the control circuit 240 may include current transducers (e.g., CTs) that sense current flows between the load bus 210 and the power source 10 and/or sensors that detect the operation of breakers or other circuit interruption devices that connect the power source to the load bus 210.

Responsive to detection of a loss of the power source 10, the control circuit 240 causes the utility breaker 40 to open and UPS 230 to begin driving the disengaged generator 222 to maintain operation of the generator 222 as an induction motor. During the time the UPS 230 is driving the generator 222, all or some of the load 20 may be shed or the UPS 230 may provide power to the load 20 or portions thereof.

Concurrent with the UPS 230 driving the generator 222, the control circuit 240 may cause the prime mover 224 to start and accelerate. When the speed of the prime mover 224 is sufficient, e.g., when an engine shaft speed of the prime mover 224 is greater than a shaft speed of the generator 222, the clutch 226 may be engaged, allowing the prime mover 224 to take over driving of the generator 222. In this manner, the generator 222 may transition to operation as an induction generator. Because the generator 222 is operating as an induction generator, speed differences between the prime mover 224 and the generator 222 may not be critical, as the generator 222 may slip to match the engine speed. High impedance of the rotor windings of the generator 222 may limit shaft torque to allow the prime mover 224 and the generator 222 to come into alignment in a relatively smooth fashion.

Concurrent with operation of the generator 222 as an induction generator, the control circuit 240 may cause the UPS 230 to start delivering reactive current to the generator 222 to maintain magnetization, thereby enabling the generator 222 to deliver real power to the load bus 210. In this manner, the generator 222 may begin to deliver power to the load bus 210 in a relatively short time period. The UPS 230 may also continue to provide power to at least some of the load 20 until the generator 222 begins to supply power.

Figure 3:
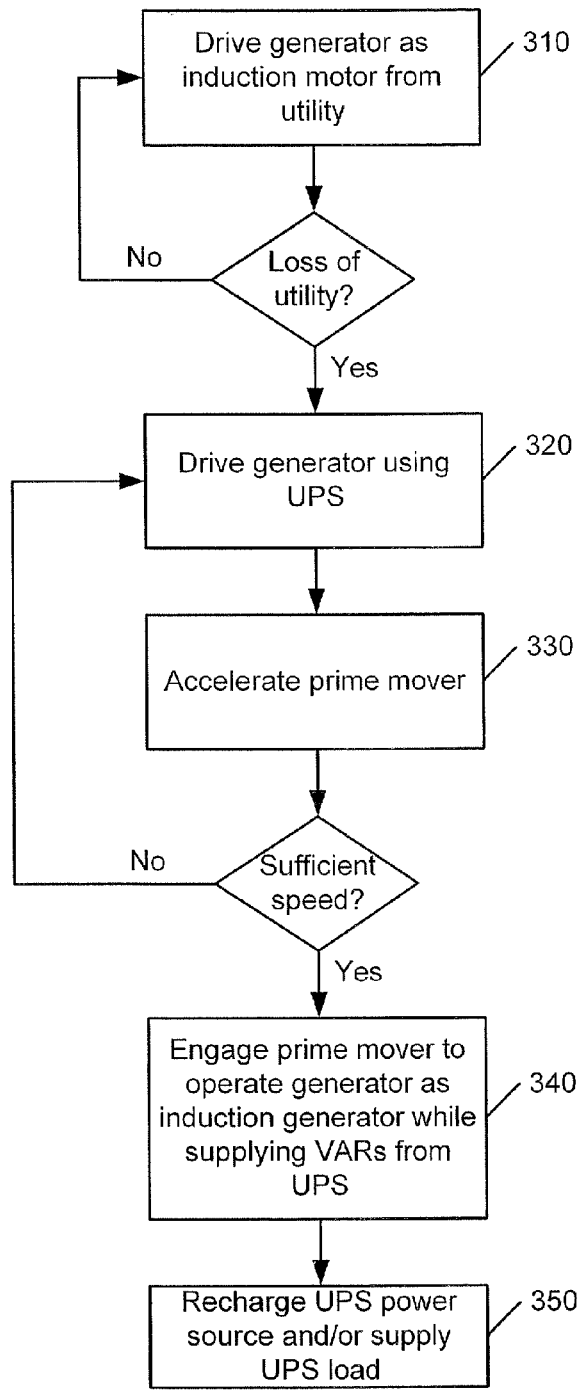
FIG. 3 is a flowchart illustrating exemplary operations of the power system of FIG. 2 according to some embodiments of the present invention.

FIG. 3 is a flowchart illustrating exemplary operations of the system of FIG. 2 according to further embodiments of the present invention. While the power source 10 is present, the generator 222 is driven by the primary power source 10 and operates as an induction motor (block 310). Responsive to loss of the power source 10, the power source 10 may be disconnected from the load bus 210 and the UPS 230 may take over driving the generator 222 as an induction motor (block 320). Concurrently, selected portions of the load 20 on the load bus 210 may be shed to prevent overload of the UPS 230.

The prime mover 224 is started and accelerated (block 330). When the prime mover 224 has reached a sufficient speed, e.g., a speed slightly greater than the generator speed, the prime mover 224 engages the generator 222 and transitions the generator 222 to operation as an induction generator, assisted by the UPS 230, which supplies reactive power (block 340). After the generator 222 begins to deliver power to the load bus 210, the UPS 230 may receive real power to, for example, charge its battery and/or provide power to loads connected to its output (block 350). Portions of the load 20 previously shed from the load bus 230 may also be selectively reconnected and powered by the generator 222.

Figure 4:
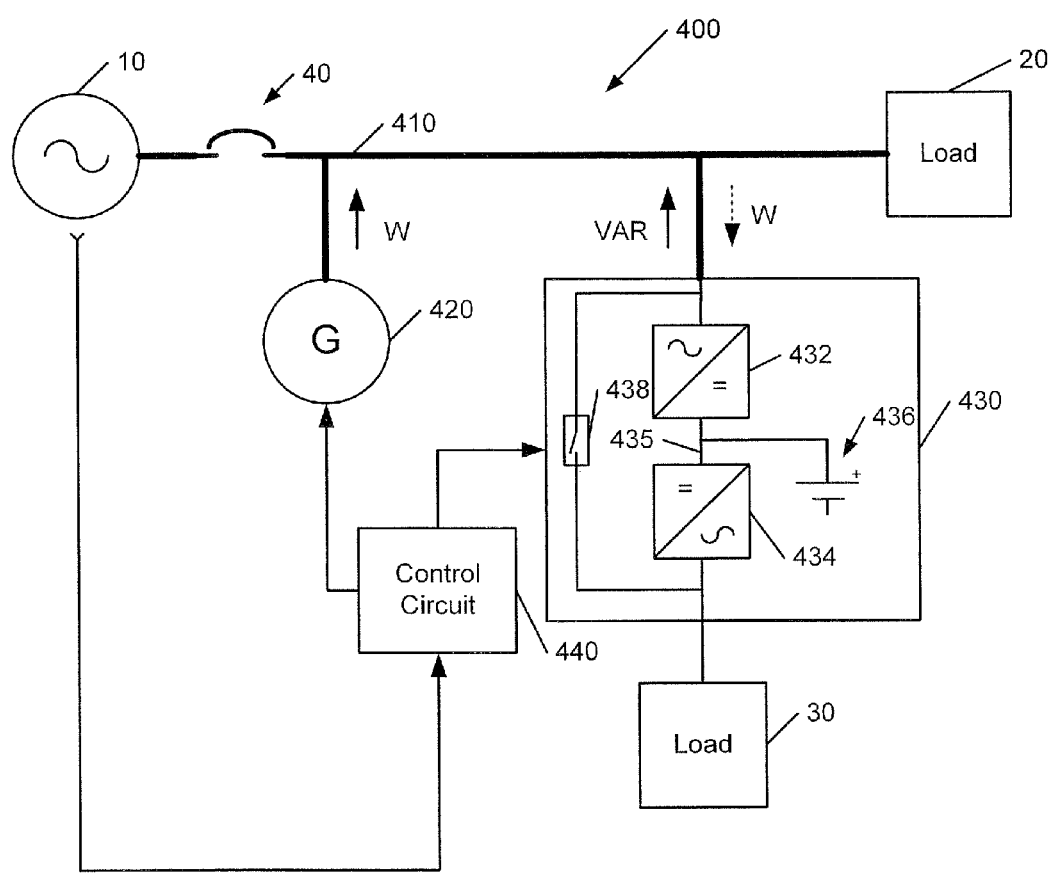
FIG. 4 is a schematic diagram illustrating a power system and operations using a bidirectional power converter of an uninterruptible power supply according to some embodiments of the present invention.

In further embodiments of the present invention, UPS operations along the lines discussed above may be implemented using a UPS with an input power converter with the capability to support bidirectional power flows. Referring to FIG. 4, a power system 400 according to some embodiments of the present invention includes a load bus 410, a generator 420 and a UPS 430. A control circuit 440 controls the generator 420 and UPS 430. In the illustrated embodiments, the UPS 430 has an on-line configuration and includes an input converter 432 configured to be coupled to the load bus 410 and an output converter 434 coupled to the input converter 432 by a DC bus 435. The output converter 434 is configured to be coupled to a load 30. A battery 436 or other auxiliary power source is coupled to the DC bus 435 to serve as a backup power source for the DC bus 435. The UPS 430 further includes a static bypass circuit 438 configured to bypass the first and second converters 432, 434 to support, for example, direct provision of power from the load bus 410 to the load 30.

As shown, the input converter 432 may be configured to support concurrent reactive and real power transfers to and from the load bus 410. In particular, the input converter 432 may be a four-quadrant converter with the capability to source and sink real and reactive power. For example, the input converter 432 may be configured to provide reactive power to the load bus 410 to support operation of the generator 420 as an induction generator along lines discussed above, while concurrently receiving real power from the load bus 410 for charging the battery 436 and/or providing power to the load 30. The input converter 432 may also support real power flow from the battery 436 to the load bus 410 when the UPS 430 is used to power the load bus 410 when neither the generator 420 nor the power source 10 is providing power. Converters that may be configured to support such operations include converters with an active bridge topology, such as converters similar to those described in U.S. Pat. No. 6,906,933 to Taimela.

It will be appreciated that other techniques for utilizing an on-line UPS and/or other types of UPS configurations may be used with the present invention. For example, rather than providing and receiving power to and from the load bus 410 using the input converter 432 as discussed above, the bypass circuit 438 may be used to provide similar functionality via the output converter (e.g., inverter) 434 of the UPS 430. On-line UPS systems that use a bypass circuit in such a manner to support flexible routing of power flows from an output converter are discussed, for example, in U.S. patent application Ser. No. 7,050,312 to Tracy et al. In other embodiments of the present invention, a standby or line-interactive UPS may be used in manner similar to that discussed above for the on-line UPS 430 shown in FIG. 4.

According to still further embodiments of the present invention, a power system configured along lines discussed above may further include a generator that is configured to selectively operate as an induction machine and a synchronous machine to support staged generator start up procedures that include operations along the lines discussed with additional transition to synchronous generator operation. For example, referring to FIG. 5, a power system 500 according to some embodiments of the present invention may include a load bus 510, a generator system 520 and a UPS 530. The UPS 530 serves a critical load 30 and may include an input converter 532, DC link 535, output converter 534, battery 536 and bypass circuit 538 along lines discussed above with reference to FIG. 4.

As shown, the generator system 520 includes a generator 522 configured to be mechanically coupled to a prime mover 524 via a clutch 526, along lines discussed above with reference to FIG. 2. The generator system 520 further includes a reconfigurable rotor winding circuit 528 that may provide various connections and excitation for a rotor field winding of the generator 522. In particular, the rotor winding circuit 528 may be selectively configurable to operate the generator 522 as an induction machine and a synchronous machine. For example, the rotor winding circuit 528 may be configured to short the rotor field winding (or use an existing Amortisseur or damping winding) to operate the generator 522 as an induction machine and to provide an excitation current to the rotor field winding to operate the generator 522 as a synchronous machine.

Control circuitry for the system 500 includes a first breaker 550a configured to couple and decouple the load bus 510 to and from a power source 10 and second and third breakers 550b, 550c that couple and decouple respective life safety and essential loads 20a, 20b to and from the load bus 510. The control circuitry further includes a controller 540 that is operatively associated with the generator system 520, the UPS 530 and the breakers 550a, 550b, 550c. In particular, the controller 540 includes a generator control circuit 542 that is configured to control the system 520, e.g., the prime mover 524, clutch 526 and rotor winding circuit 528. The controller 540 also includes a UPS control circuit 544 that, interoperating with the generator control circuit 542, controls components of the UPS 530, such as the input converter 532, output converter 534 and/or the bypass circuit 538. It will be appreciated that the controller 540 may be implemented in an integrated assembly or may be implemented in a distributed manner, e.g., portions of the controller 540 may be integrated with the generator system 520 and/or the UPS 530.

Figure 5:
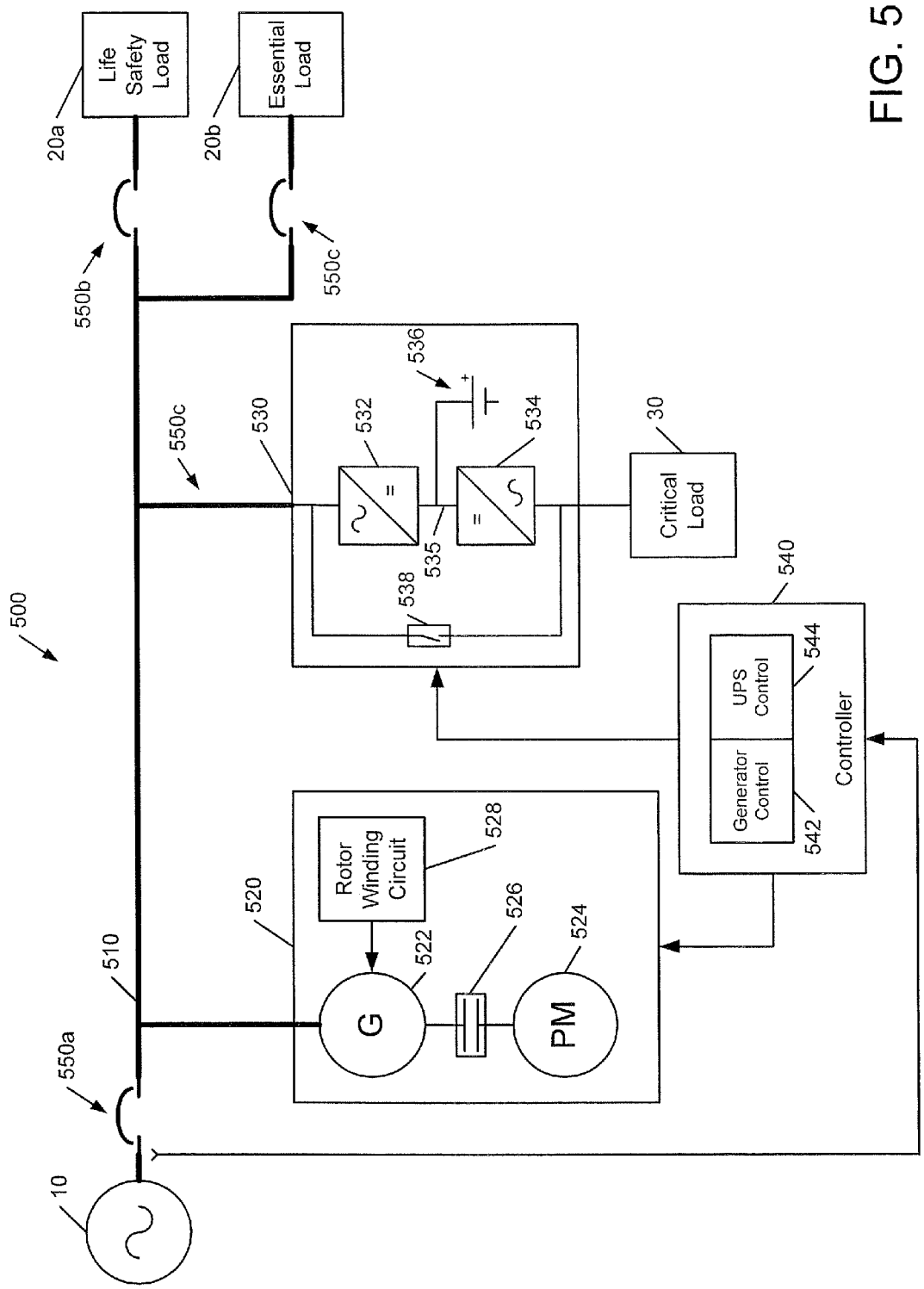
FIG. 5 is a schematic diagram illustrating a power system and operations using a multi-mode generator according to further embodiments of the present invention.
Figure 6:
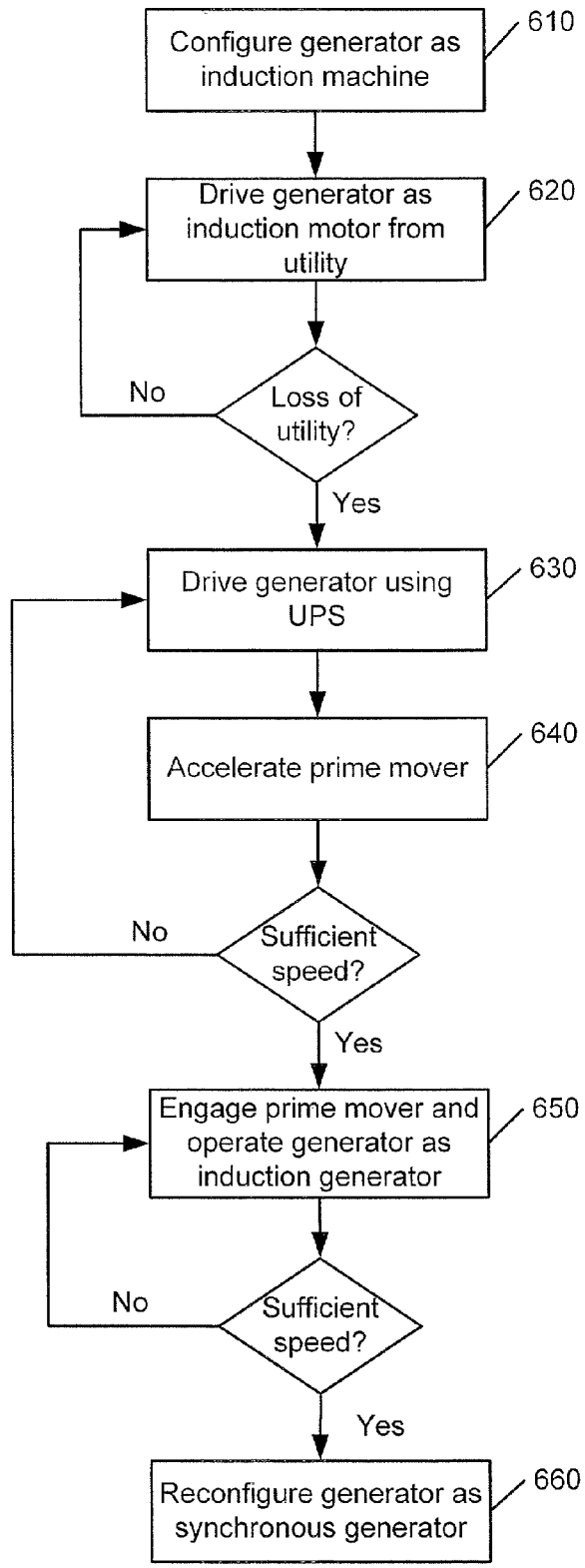
FIG. 6 is a flowchart illustrating exemplary operations of the power system of FIG. 5 according to some embodiments of the present invention.

FIG. 6 is a flowchart illustrating exemplary operations of the power system 500 of FIG. 5 according to some embodiments of the present invention. With the power source 10 present, the generator control circuit 542 configures the rotor winding circuit 528 to operate generator 522 as an induction machine, and power from the load bus 510 drives the generator 522 as an induction motor (blocks 610, 620). Upon detection of a loss of the power source 10, the controller 540 opens the first breaker 550a and the UPS control circuit 544 causes the UPS 530 to begin driving the generator 522 as an induction motor, e.g., by providing power from the battery 536 via the input converter 532 (block 630). At or around this time, the controller 540 may also operate the second and third breakers 550b, 550c to selectively shed load and prevent overload of the UPS 530.

The generator control circuit 542 also starts and begins acceleration of the prime mover 524 with the clutch 526 still disengaged (block 640). When the speed of the prime mover meets a predetermined criterion, the generator control circuit 542 causes the clutch 526 to engage and start driving the generator 522 to begin operation as an induction generator, and the UPS control circuit 544 concurrently causes the UPS 530 to provide reactive power to support operation of the generator 522 (block 650). After the generator 522 achieves a desired speed, the generator control circuit 542 may reconfigure the rotor winding circuit 528 to operate the generator 522 as a synchronous machine, such that the generator 522 begins to operate as a synchronous generator, capable of generating reactive power without assistance from the UPS 530 (block 660). After this transition, the UPS control circuit 544 may cause the UPS 530 to stop providing reactive power, although the UPS 530 may continue to provide reactive power if needed for the particular loads on the bus 510. Selected life safety and essential loads 20a, 20b shed after the loss of the primary source 10 may be reconnected to the load bus 510 after the generator 522 begins supplying power to the load bus 510.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a power system comprising a load bus configured to be connected to a power source, a generator and an uninterruptible power supply (UPS), the method comprising:
    operating the generator as an induction generator to provide power to the load bus while providing reactive power to the load bus from the and then
    transitioning to operating the generator as a synchronous generator to provide power to the load bus.

2. The method of claim 1:
    wherein operating the generator as an induction generator to provide power to the load bus while providing reactive power to the load bus from the UPS is preceded by operating the generator as an induction motor while the load bus is receiving power from the power source; and
    wherein operating the generator as an induction generator to provide power to the load bus while providing reactive power to the load bus from the UPS comprises driving the generator with a prime mover responsive to a loss of the power source.

3. The method of claim 2, wherein driving the generator with a prime mover responsive to a loss of the power source is preceded by driving the generator with the UPS responsive to the loss of the power source to maintain operation of the generator as an induction motor.

4. The method of claim 3, further comprising powering a load from the UPS via the load bus while the UPS drives the generator.

5. The method of claim 3, wherein driving the generator with a prime mover responsive to a loss of the power source comprises:
    accelerating the prime mover while driving the generator with the UPS; and engaging the generator with the prime mover responsive to a status of the prime mover meeting a predetermined criterion.

6. The method of claim 1, wherein the UPS comprises a converter having a first port configured to be coupled to the load bus and a second port configured to be coupled to a UPS auxiliary power source, and further comprising providing power to the UPS auxiliary power source from the load bus via the converter while operating the generator as an induction generator.

7. The method of claim 1:
wherein operating the generator as an induction generator to provide power to the load bus while providing reactive power to the load bus from the UPS comprises shorting a rotor field winding of the generator; and
wherein operating the generator as a synchronous generator to provide power to the load bus comprises applying an excitation current to the rotor field winding.

8. A power system comprising;
a generator configured to be coupled to a load bus;
a UPS configured to be coupled to the load bus; and
a control circuit operatively associated with the generator and the UPS and configured to detect a loss of a power source coupled to the load bus and to responsively operate the generator as an induction generator to provide power to the load bus while providing reactive power to the load bus from the UPS and to then transition the generator from operation as an induction generator to operation as a synchronous generator.

9. The system of claim 8, further comprising a prime mover operatively associated with the control circuit and wherein the control circuit is further configured to operate the generator as an induction motor while the load bus is receiving power from the power source and to cause the prime mover to drive the generator as an induction generator responsive to a loss of the power source.

10. The system of claim 9, wherein the control circuit is configured to cause the UPS to drive the generator responsive to the loss of the power source to maintain operation of the generator as an induction motor.

11. The system of claim 10, wherein the control circuit is further configured to cause the UPS to serve a load via the load bus while the UPS drives the generator.

12. The system of claim 11, wherein the control circuit comprises at least one circuit interruption device configured to selectively connect the load.

13. The system of claim 8, wherein the control circuit is configured to short a rotor field winding of the generator when operating the generator as an induction generator and to apply an excitation current to the rotor field winding when operating the generator as a synchronous generator.

14. The system of claim 8, wherein the UPS comprises a converter configured to support concurrent power flows to and from the load bus.

15. An apparatus for controlling a power system comprising a load bus configured to receive power from a power source, a generator configured to be coupled to the load bus and a UPS configured to be coupled to the load bus, the apparatus comprising:
a generator control circuit configured to selectively operate the generator as an induction motor and an induction generator responsive to a status of the power source; and
a UPS control circuit configured to selectively provide real and reactive power to the load bus from the UPS in cooperation with the generator control circuit, wherein the generator control circuit is configured to operate the generator as an induction motor while the load bus is receiving power from the power source, to cause a prime mover to drive the generator as an induction generator responsive to a loss of the power source and to transition the generator from operation as an induction generator to operation as a synchronous generator.

16. The apparatus of claim 15, wherein the UPS control circuit is configured to cause the UPS to deliver reactive power to the load bus when the generator is operating as an induction motor.

17. The apparatus of claim 15, wherein the UPS control circuit is configured to cause the UPS to provide power to the generator responsive to the loss of the power source to maintain operation of the generator as an induction motor.

18. The apparatus of claim 15, wherein the UPS comprises a bidirectional power converter circuit, and wherein the UPS control circuit is configured to cause the bidirectional power converter circuit to support concurrent power flows to and from the load bus.

* * * * *

UNITED STATES PATENT AND TRADEMARK OFFICE
CERTIFICATE OF CORRECTION

| | | |
|---|---|---|
| PATENT NO. | : 7,566,990 B2 | |
| APPLICATION NO. | : 11/780520 | |
| DATED | : July 28, 2009 | |
| INVENTOR(S) | : Loucks et al. | |

It is certified that error appears in the above-identified patent and that said Letters Patent is hereby corrected as shown below:

Column 8, Claim 1, Line 41: Please correct "the and then" to read
-- the UPS; and then --

Signed and Sealed this

Sixth Day of October, 2009

David J. Kappos
*Director of the United States Patent and Trademark Office*